United States Patent
Peng (10) Patent No.: US 12,244,513 B2
(45) Date of Patent: Mar. 4, 2025

(54) PATH DETERMINATION METHOD, NETWORK ELEMENT, AND COMPUTER-READABLE STORAGE MEDIUM

(71) Applicant: ZTE Corporation, Shenzhen (CN)

(72) Inventor: Shaofu Peng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 96 days.

(21) Appl. No.: 18/028,191

(22) PCT Filed: Nov. 30, 2021

(86) PCT No.: PCT/CN2021/134515
§ 371 (c)(1),
(2) Date: Mar. 23, 2023

(87) PCT Pub. No.: WO2022/166346
PCT Pub. Date: Aug. 11, 2022

(65) Prior Publication Data
US 2023/0379266 A1    Nov. 23, 2023

(30) Foreign Application Priority Data
Feb. 4, 2021   (CN) .......................... 202110154826.3

(51) Int. Cl.
*H04L 47/724* (2022.01)
*H04L 45/302* (2022.01)
(Continued)

(52) U.S. Cl.
CPC .......... *H04L 47/724* (2013.01); *H04L 45/308* (2013.01); *H04L 47/125* (2013.01); *H04L 47/22* (2013.01); *H04L 47/627* (2013.01)

(58) Field of Classification Search
None
See application file for complete search history.

(56) References Cited

U.S. PATENT DOCUMENTS 10,601,724 B1    3/2020    Filsfils et al.
10,764,175 B1 *  9/2020    Filsfils ................... H04L 45/20
(Continued)

FOREIGN PATENT DOCUMENTS

| CN | 107659426 A | 2/2018 |
| CN | 109361547 A | 2/2019 |

OTHER PUBLICATIONS

International Search Report and Written Opinion for International Application No. PCT/CN2021/134515, mailed Mar. 3, 2022.

*Primary Examiner* — Anh Ngoc M Nguyen
(74) *Attorney, Agent, or Firm* — Wolf, Greenfield & Sacks, P.C.

(57) ABSTRACT

A path determination method, a network element, and a computer-readable storage medium are disclosed. The path determination method may include: acquiring link bandwidth data of all physical links within a network slice, where the link bandwidth data corresponds to the network slice, and the network slice is created by an interior gateway protocol flex algorithm (S100); acquiring a required bandwidth of a transmission channel within the network slice (S200); and determining, according to the link bandwidth data and the required bandwidth, a path for the transmission channel from among all the physical links (S300).

16 Claims, 4 Drawing Sheets

---

Acquire link bandwidth data of all physical links within a network slice, where the link bandwidth data corresponds to the network slice  — S100

Acquire a required bandwidth of a transmission channel within the network slice  — S200

Determine, according to the link bandwidth data and the required bandwidth, a path for the transmission channel from among all the physical links  — S300

(51) Int. Cl.
*H04L 47/125* (2022.01)
*H04L 47/22* (2022.01)
*H04L 47/625* (2022.01)

(56) References Cited

U.S. PATENT DOCUMENTS

2017/0257870 A1    9/2017   Farmanbar et al.
2020/0008067 A1*   1/2020   Filsfils .................. H04L 47/825

* cited by examiner

```
┌──────────────────────────────────────────────────────────────────────────┐
│ Obtain an available link bandwidth of the local link according to a      │ ╱‾S150
│ difference between the maximum reserved bandwidth of the local link and  │
│ the utilized link bandwidth of the local link                            │
└──────────────────────────────────────────────────────────────────────────┘
                                      │
                                      ▼
┌──────────────────────────────────────────────────────────────────────────┐
│ Acquire an available link bandwidth of each of the physical links        │ ╱‾S160
│ corresponding to other network elements within the network slice         │
└──────────────────────────────────────────────────────────────────────────┘
```

Fig. 7

| Type | Length | Algorithm |
|------|--------|-----------|
| Maximum Reservable Link Bandwidth | | |

Fig. 8

| Type | Length | Algorithm |
|------|--------|-----------|
| Utilized Link Bandwidth | | |

Fig. 9

| Type | Length | Algorithm |
|------|--------|-----------|
| Available Link Bandwidth | | |

PATH DETERMINATION METHOD, NETWORK ELEMENT, AND COMPUTER-READABLE STORAGE MEDIUM

CROSS-REFERENCE TO RELATED APPLICATION

This application is a national stage filing under 35 U.S.C. § 371 of international application number PCT/CN2021/134515 filed on Nov. 30, 2021, which claims priority to Chinese patent application No. 202110154826.3 filed on Feb. 4, 2021. The contents of these applications are incorporated herein by reference in their entirety.

TECHNICAL FIELD

Embodiments of the present disclosure relate to, but are not limited to, the field of communications technologies, and in particular, to a path determination method, a network element, and a computer-readable storage medium.

BACKGROUND

The core requirement of 5G network slices for a bearer network is that different network slices need to have their own dedicated bearer subnetworks. An existing manner to support the requirements of the 5G network slices is to use Interior Gateway Protocol (IGP) Flex Algorithm (FA) technologies. Multiple IGP algorithms are run in the same topology to calculate multiple FA planes, each FA plane can represent one network slice, and different upper-layer service traffic can be carried on different FA planes.

Current IGP FA technologies allow for different Quality of Service (QoS) policies of different algorithms on a forwarding plane, for example, including different bandwidths, traffic Classes of Service, queue scheduling policies, and discard policies. However, the above capabilities supported by the IGP FA technologies are only local behaviors of the forwarding plane within a node. The current IGP FA technologies do not support a path selection based on bandwidth resource reservation so that paths cannot be arranged for service traffic within the entire network slice to avoid unnecessary traffic congestions.

SUMMARY

The following is a summary of the subject matters described in detail herein. This summary is not intended to limit the scope of protection of the claims.

Embodiments of the present disclosure provide a path determination method, a network element, and a computer-readable storage medium.

In accordance with a first aspect of the present disclosure, an embodiment provides a path determination method, which is applied to a network element. The method may include: acquiring link bandwidth data of all physical links within a network slice, where the link bandwidth data corresponds to the network slice, and the network slice is created by an interior gateway protocol flex algorithm; acquiring a required bandwidth of a transmission channel within the network slice; and determining, according to the link bandwidth data and the required bandwidth, a path for the transmission channel from among all the physical links.

In accordance with a second aspect of the present disclosure, an embodiment further provides a network element, which may include: a memory, a processor, and a computer program stored in the memory and executable by the processor, where the computer program, when executed by the processor, causes the processor to perform the path determination method of the first aspect.

In accordance with a third aspect of the present disclosure, an embodiment further provides a computer-readable storage medium storing computer-executable instructions for performing the path determination method described above.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It is to be noted that although a logical order is shown in the flowcharts, the steps shown or described may be performed, in some cases, in a different order from the order shown or described in the flowcharts. The terms "first", "second", etc. in the description, the claims and the above-mentioned drawings are intended to distinguish between similar objects and are not necessarily to describe a specific order or sequence.

The present disclosure provides a path determination method, a network element, and a computer-readable storage medium. By acquiring link bandwidth data of all physical links within the network slice, and acquiring a required bandwidth required by a transmission channel within the network slice, a path satisfying the transmission channel is determined from among all the physical links according to the link bandwidth data and the required bandwidth. Since the path for the transmission channel is determined according to the link bandwidth data of the physical links and the required bandwidth of the transmission channel, a path selection based on bandwidth resource reservation is achieved, such that paths can be arranged for service traffic within the entire network slice to avoid undesirable traffic congestions.

The embodiments of the present disclosure will be further explained below with reference to the accompanying drawings.

Figure 1:
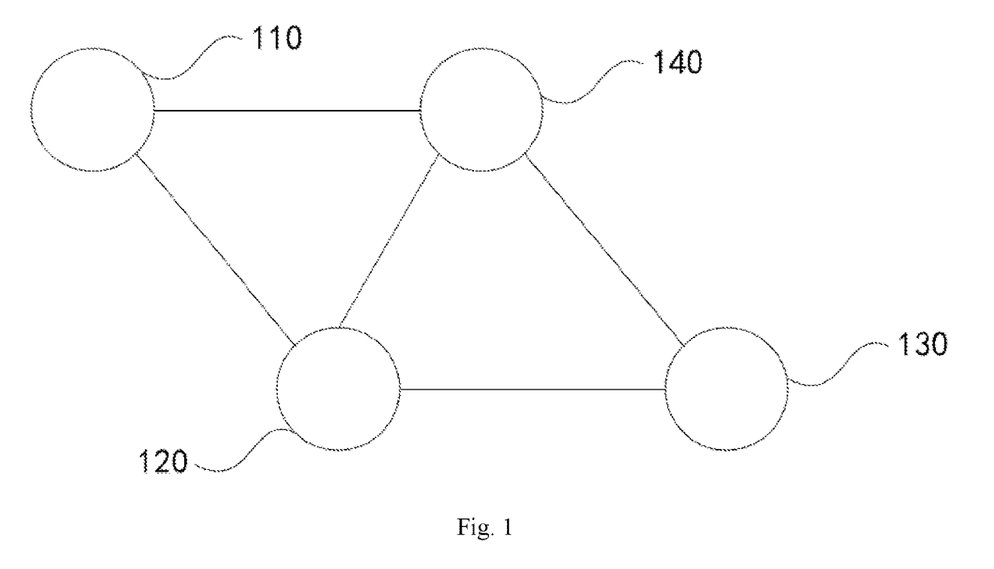
FIG. 1 is a schematic diagram of a network topology for performing a path determination method provided by an embodiment of the present disclosure.

As shown in FIG. 1, FIG. 1 is a schematic diagram of a network topology for performing a path determination method provided by an embodiment of the present disclosure. In the example shown in FIG. 1, the network topology includes a first node 110, a second node 120, a third node 130, and a fourth node 140. The first node 110, the second node 120, the third node 130 and the fourth node 140 all belong to the same network slice, and there are physical links connected between the first node 110 and the second node 120, between the second node 120 and the third node 130, between the third node 130 and the fourth node 140, between the first node 110 and the fourth node 140, and between the second node 120 and the fourth node 140. The first node 110, the second node 120, the third node 130, and the fourth node 140 may all be network devices, such as routers or switches, capable of forwarding packets.

In addition, the network topology may also include a network controller (not shown in FIG. 1), such as a Software Defined Network (SDN) controller, etc. The network controller is connected to the first node 110, the second node 120, the third node 130, and the fourth node 140 separately, and can control the first node 110, the second node 120, the third node 130, and the fourth node 140 separately.

Within the network slice, the network controller or a head node that needs to send the packets can determine a packet forwarding path from the head node to a tail node within the network slice according to the link bandwidth data of the physical links within the network slice and the required bandwidth required by the transmission channel for transmitting the packets.

The network topology and application scenario described in the embodiments of the present disclosure are intended to more clearly explain the technical schemes of the embodiments of the present disclosure, and do not constitute a limitation on the technical schemes provided by the embodiments of the present disclosure. Those having ordinary skill in the art may understand that, with evolution of the network topology and emergence of new application scenarios, the technical schemes provided by the embodiments of the present disclosure are also applicable to similar technical problems.

Those having ordinary skill in the art may understand that the topological structure shown in FIG. 1 does not constitute a limitation on the embodiments of the present disclosure, and there may be more or fewer components than illustrated, or some of the components may be combined, or a different arrangement of the components may be configured.

Based on the structure of the network topology described above, various embodiments of the path determination method of the present disclosure are proposed.

Figure 2:
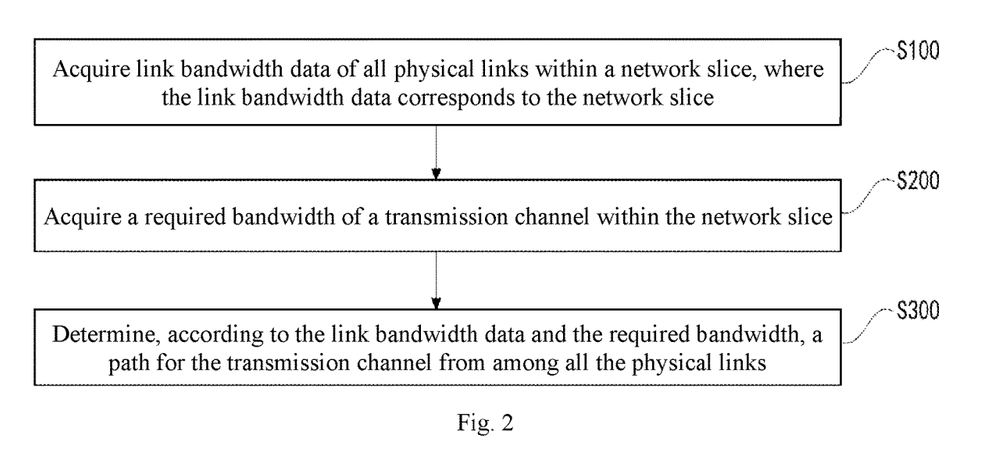
FIG. 2 is a flowchart of a path determination method provided by an embodiment of the present disclosure.

As shown in FIG. 2, FIG. 2 is a flowchart of a path determination method provided by an embodiment of the present disclosure. The path determination method can be applied to a network element, such as the network controller or the head node (such as the first node 110) that needs to send the packets in the network topology shown in FIG. 1, within a network. The path determination method includes, but is not limited to, steps S100, S200 and S300.

At S100, link bandwidth data of all physical links within a network slice are acquired, where the link bandwidth data corresponds to the network slice.

It is to be noted that the network slice is a network slice created by an interior gateway protocol flex algorithm.

It is to be noted that the link bandwidth data may include at least one of a maximum reserved bandwidth, a utilized link bandwidth, an available link bandwidth, and an allocated reserved bandwidth, which is not specifically limited in this embodiment. For example, the link bandwidth data may include a maximum reserved bandwidth and an allocated reserved bandwidth; and for another example, the link bandwidth data may be an available link bandwidth.

The maximum reserved bandwidth refers to the maximum amount of available bandwidth allocated by the physical link for the network slice. For example, it is assumed that the physical bandwidth of the physical link is 100 G, and 20 G of the physical bandwidth of 100 G can be allocated for the network slice, thus the maximum reserved bandwidth dedicated to this network slice is 20 G. The network controller or the head node that needs to send the packets can acquire the maximum reserved bandwidth during the process of the bandwidth planning for the physical link.

The utilized link bandwidth refers to the link bandwidth that has been utilized in the maximum reserved bandwidth. The utilized link bandwidth can change dynamically as the service traffic within the network changes, and the utilized link bandwidth is not greater than the maximum reserved bandwidth corresponding to the utilized link bandwidth. For example, assuming that the maximum reserved bandwidth allocated by a physical link for a network slice is 20 G, when traffic runs on the physical link and it is detected that 1 G bandwidth of the traffic running on the physical link belongs to the network slice, it can be determined that the utilized link bandwidth corresponding to the network slice is 1 G. The network controller or the head node which needs to send the packets can use the traffic bandwidth passing through the physical link that is corresponding to the corresponding network slice as the utilized link bandwidth, where this traffic bandwidth can be obtained from the network through real-time measurement.

The available link bandwidth refers to the remaining available link bandwidth in the maximum reserved bandwidth. The available link bandwidth can be obtained according to a difference between the maximum reserved bandwidth and the utilized link bandwidth. The available link bandwidth can change dynamically as the utilized link bandwidth changes. For example, assuming that the maximum reserved bandwidth allocated by a physical link for a network slice is 20 G, when traffic runs on the physical link and it is detected that 1 G bandwidth of the traffic run on the physical link belongs to the network slice, it can be determined that the available link bandwidth corresponding to the network slice is 19 G. The network controller or the head node that needs to send the packets can acquire from the network the available link bandwidth of the physical link corresponding to the respective network slice.

The allocated reserved bandwidth refers to the sum of static reserved bandwidths allocated by the physical links for the transmission channel within the network slice in the maximum reserved bandwidth. The allocated reserved bandwidth is not greater than the maximum reserved bandwidth corresponding thereto. For example, assuming that the maximum reserved bandwidth allocated by a physical link for a network slice is 20 G, and a first transmission channel supporting 2 G bandwidth and a second transmission channel supporting 4 G bandwidth are established within the network slice, the first transmission channel and the second transmission channel both pass through the physical link, to ensure the effective transmission of data in these transmission channels, it is feasible to allocate 2 G of the maximum reserved bandwidth of 20 G for the first transmission channel and 4 G of the maximum reserved bandwidth of 20 G for the second transmission channel, thus the allocated reserved bandwidth of the physical link is 6 G. It is to be noted that the allocated reserved bandwidth has no bearing on the traffic running on the physical link, and the allocated reserved bandwidth cannot be changed regardless of whether there is traffic running on the physical link or not. The network controller or the head node that needs to send the packets can obtain the allocated reserved bandwidth during the process of the transmission path planning.

At S200, a required bandwidth of a transmission channel within the network slice is acquired.

It is to be noted that the transmission channel refers to a transmission path for transmitting the packets from the head node to the tail node. The network controller or the head node that needs to send the packets can determine the required bandwidth of the transmission channel before the transmission channel is established, such as acquire the required bandwidth of the transmission channel during the process of calculating the transmission channel according to packet forwarding policies. The transmission channel may be a Traffic Engineering path (TE path), a shortest path, etc., which is not specifically limited in this embodiment.

The required bandwidth of the transmission channel refers to a traffic bandwidth that the transmission channel needs to support and is a planning item.

At S300, a path for the transmission channel is determined from among all the physical links according to the link bandwidth data and the required bandwidth.

In this step, since the link bandwidth data of all the physical links within the network slice are acquired in step S100 and the required bandwidth of the transmission channel within the network slice is acquired in step S200, the path for the transmission channel can be determined from among all the physical links according to the link bandwidth data and the required bandwidth. Since the required bandwidth is the bandwidth for transmitting the data packets required by the transmission channel, the physical links corresponding to the link bandwidth data satisfying the required bandwidth can be used as the path through which the transmission channel passes. Therefore, the path for the transmission channel can be determined from among all the physical links according to the link bandwidth data and the required bandwidth. For example, it is assumed that the acquired link bandwidth data of a physical link is 10 G and the acquired required bandwidth of the transmission channel is 5 G, i.e. the link bandwidth data of the physical link satisfies the required bandwidth of the transmission channel, thus the path for the transmission channel may include the physical link.

According to the path determination method including the above steps S100, S200 and S300, by acquiring link bandwidth data of all physical links within the network slice, and acquiring a required bandwidth required by a transmission channel within the network slice, a path satisfying the transmission channel can be determined from among all the physical links according to the link bandwidth data and the required bandwidth. Since the path for the transmission channel is determined according to the link bandwidth data of the physical links and the required bandwidth of the transmission channel, a path selection based on bandwidth resource reservation is achieved, such that paths can be arranged for service traffic within the entire network slice to avoid undesirable traffic congestions.

Figure 3:
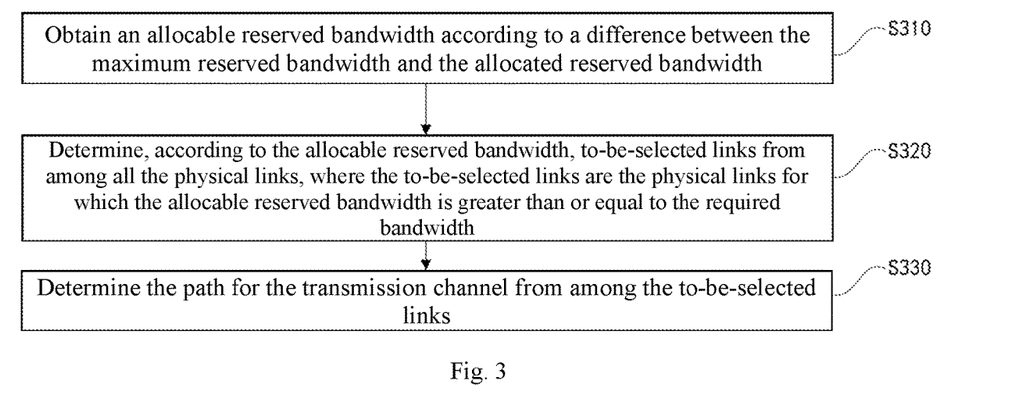
FIG. 3 is a detailed flowchart of determining a path for a transmission channel according to link bandwidth data and a required bandwidth in a path determination method provided by another embodiment of the present disclosure.

In an embodiment, in the case where the link bandwidth data include a maximum reserved bandwidth and an allocated reserved bandwidth, as shown in FIG. 3, the step S300 may include, but is not limited to, the following steps.

At S310, an allocable reserved bandwidth is obtained according to a difference between the maximum reserved bandwidth and the allocated reserved bandwidth.

At S320, to-be-selected links are determined according to the allocable reserved bandwidth from among all the physical links, where the to-be-selected links are the physical links for which the allocable reserved bandwidth is greater than or equal to the required bandwidth.

At S330, the path for the transmission channel is determined from among the to-be-selected links.

It is to be noted that the steps S310 to S330 in this embodiment may be executed by a network controller. After the network controller acquires the maximum reserved bandwidth of all the physical links within the network slice and the required bandwidth of the transmission channel within the network slice, the network controller can centrally and uniformly maintain the bandwidth resource reservation condition of the physical links within the network slice, such that corresponding link resources can be selected for the transmission channels within the network slice. The maximum reserved bandwidth of the physical link can be obtained through Border Gateway Protocol Link State (BGP-LS) protocols defined in the standard RFC7752.

To make the bandwidth resource corresponding to the maximum reserved bandwidth of a physical link be dedicated to all service traffic within the corresponding network slice, the network controller can maintain the bandwidth resource reservation condition of the physical link within the network slice by using the maximum reserved bandwidth and the allocated reserved bandwidth. The network controller may obtain the allocable reserved bandwidth according to the difference between the maximum reserved bandwidth and the allocated reserved bandwidth, then determine physical links for which the allocable reserved bandwidth is greater than or equal to the required bandwidth to be to-be-selected links among all the physical links, and then select the suitable physical links from the to-be-selected links, thereby determining the path for the transmission channel such that the sum of the static reserved bandwidths allocated by all transmission channels passing through this physical link (i.e. the current allocated reserved bandwidth)

does not exceed the maximum reserved bandwidth of this physical link. That is, when the network controller needs to calculate the transmission channel passing through a physical link within a specific network slice, it is feasible to perform a static reservation of bandwidth within the range of the maximum reservable bandwidth resource represented by the maximum reserved bandwidth of the physical link as long as the remaining allocable reserved bandwidth after the static reservation of bandwidth is performed is not less than 0.

To illustrate with an example, assuming that the maximum reserved bandwidth of a physical link (referred to as Link-1) within a network slice is 10 G, when one transmission channel (referred to as te-path-1) of which the required bandwidth (referred to as RLB @te-path-1) is 1G needs to be deployed in a network slice, the network controller calculates, according to the difference between the maximum reserved bandwidth and the allocated reserved bandwidth of each physical link, to obtain the allocable reserved bandwidth of each physical link. In this example, the network controller calculates, according to the difference between the maximum reserved bandwidth (i.e. 10 G) and the allocated reserved bandwidth (of which the initial value is assumed to be 0, i.e. no static reserved bandwidth has been allocated for any transmission channel), the allocable reserved bandwidth of the Link-1 to be 10 G. The network controller judges and then determines that the allocable reserved bandwidth (i.e. 10 G) of Link-1 is greater than the required bandwidth (i.e. 1 G) of the te-path-1. Therefore, the network controller determines that the Link-1 is the to-be-selected link, and then in conjunction with the requirements for the link priority or the shortest path, determines that the Link-1 can be used as the path of the te-path-1, i.e. the network controller decides to allow the te-path-1 passing through the Link-1. In this case, the network controller can maintain the following information:

"The maximum reserved bandwidth of the Link-1 is 10 G, where the RLB @te-path-1 reserves 1 G, and 9 G remains as the allocable reserved bandwidth".

When another transmission channel (referred to as te-path-2) needs to be deployed within the network slice and the required bandwidth of this transmission channel (referred to as RLB @te-path-2) is 2 G, the network controller calculates the allocable reserved bandwidth of each physical link according to the difference between the maximum reserved bandwidth and the allocated reserved bandwidth of each physical link, where the network controller calculates the allocable reserved bandwidth of the Link-1 to be 9 G according to the difference between the maximum reserved bandwidth of the Link-1 (i.e. 10 G) and the allocated reserved bandwidth (i.e. 1 G reserved by the RLB @te-path-1). The network controller judges and then determines that the allocable reserved bandwidth of the Link-1 (i.e. 9 G) is greater than the required bandwidth of the te-path-2 (i.e. 2 G). Thus, the network controller determines that the Link-1 is the to-be-selected link, and then in conjunction with the requirements such as the link priority or shortest path, determines that the Link-1 can be used as the path of the te-path-2, i.e. the network controller decides to allow the te-path-2 passing through the Link-1. In this case, the network controller can maintain the following information:

"The maximum reserved bandwidth of the Link-1 is 10 G, where the RLB @te-path-1 reserves 1 G, the RLB @te-path-2 reserves 2 G, and 7 G remains as the allocated reserved bandwidth".

For each physical link within the network slice, the network controller maintains information similar to that described above, and determines, based on the information described above, whether the physical link can be included in a transmission channel, i.e. determines whether the allocable reserved bandwidth of the physical link is no less than the required bandwidth of the transmission channel. If this criterion is not satisfied, the transmission channel cannot pass through the physical link.

It is worth noting that, when the physical link is a bundled link, the network controller can also determine whether a transmission channel can pass through the bundled link according to the above criterion, i.e. determine whether the sum of static reserved bandwidths (i.e. the allocated reserved bandwidth) of all transmission channels passing through the bundled link within the network slice does not exceed the maximum reserved bandwidth of the bundled link. If the criterion is satisfied, the network controller can further decide whether to include in the transmission channel the bundled link itself or to include in the transmission channel one Layer 2 member link of the bundled link. For example, it is assumed that the maximum reserved bandwidth of the bundled link is 10 G, the bundled link includes two Layer 2 member links, and the maximum reserved bandwidth of each of the two layer 2 member links is 5 G, so if the required bandwidth of the transmission channel is 10 G, in this case, the bundled link itself needs to be included in this transmission channel, and load sharing for the traffic forwarded along this transmission channel is enabled in the bundled link; and if the required bandwidth of the transmission channel is 5 G, the network controller can select any one of the Layer 2 member links to be included in this transmission channel, and the traffic forwarded along this transmission channel is forwarded along the selected Layer 2 member link.

Figure 4:
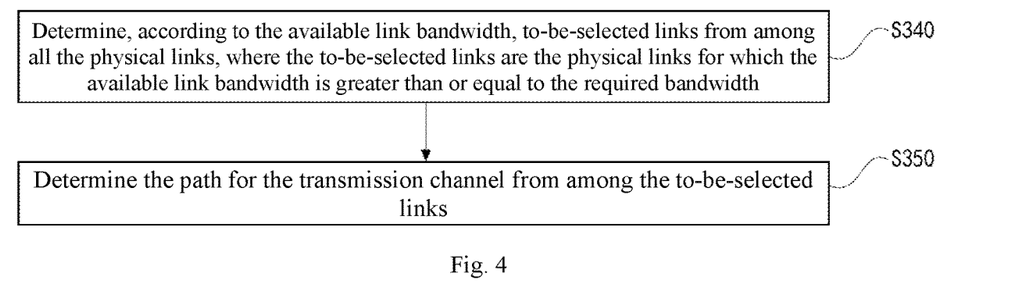
FIG. 4 is a detailed flowchart of determining a path for a transmission channel according to link bandwidth data and a required bandwidth in a path determination method provided by another embodiment of the present disclosure.

In an embodiment, in the case where the link bandwidth data include an available link bandwidth, as shown in FIG. 4, the step S300 may include, but is not limited to, the following steps.

At S340, to-be-selected links are determined from among all the physical links according to the allocable reserved bandwidth, where the to-be-selected links are the physical links for which the allocable reserved bandwidth is greater than or equal to the required bandwidth.

At S350, the path for the transmission channel is determined from among the to-be-selected links.

It is to be noted that steps S340 to S350 in this embodiment may be executed by a network controller or a head node that needs to send packets. After the network controller or the head node acquires the available link bandwidth of all the physical links within the network slice, the network controller or the head node can maintain the bandwidth resource reservation condition of the physical links within the network slice to select corresponding link resources for the transmission channels within the network slice. When the transmission channel is established within the network slice, and this transmission channel passes through a physical link, the traffic carried by this transmission channel will change the available link bandwidth of the physical link, thereby affecting the path calculation for other transmission channels passing through the physical link. Therefore, the path for the transmission channel can be determined according to the available link bandwidth of the physical link and the required bandwidth of the transmission channel.

To make the bandwidth resources corresponding to the maximum reserved bandwidth of a physical link be dedicated to all the service traffic within the corresponding network slice, the network controller or the head node can maintain the bandwidth resource reservation condition of the physical links within the network slice by using the available link bandwidth. The network controller or the head node may determine the physical links, for which the available link bandwidth is greater than or equal to the required bandwidth, from among all the physical links as to-be-selected links, and then select a suitable physical link from these to-be-selected links, thereby determining the path for the transmission channel such that the required bandwidths of all transmission channels passing through this physical link do not exceed the available link bandwidth of this physical link. That is, when the network controller or the head node needs to calculate the transmission channel passing through a physical link within a specific network slice, it is feasible to select the physical link having a suitable available link bandwidth according to the required bandwidth of the transmission channel such that the available link bandwidth of the physical link is not less than the required bandwidth of the transmission channel.

To illustrate with an example, it is assumed that the maximum reserved bandwidth of a physical link (referred to as Link-10) within a network slice is 10 G, and currently no traffic is running on this physical link, so the available link bandwidth of this physical link is 10 G. When a transmission channel (referred to as te-path-3) needs to be deployed within this network slice and the required bandwidth of this transmission channel (referred to as RLB @te-path-3) is 3 G, the network controller or the head node evaluates the physical links and determines the physical link for which the available link bandwidth is greater than or equal to the required bandwidth as the to-be-selected link, where, when evaluating the Link-10, the network controller or the head node determines that the available link bandwidth of the Link-10 (i.e. 10 G) is greater than the required bandwidth of the te-path-3 (i.e. 3 G). Therefore, the network controller or the head node determines that the Link-10 is the to-be-selected link, and then in conjunction with the requirements such as the link priority or shortest path, determines that the Link-10 can be used as the path of the te-path-3, i.e. the network controller or the head node decides to allow the te-path-3 passing through the Link-10 (at which time no traffic is running on the te-path-3). Therefore, the network controller or the head node can maintain the following information.

The information maintained by the network controller is: "The maximum reserved bandwidth of the Link-10 is 10 G, where the RLB @te-path-3 reserves 3 G, and 7 G remains as the allocated reserved bandwidth; and the utilized link bandwidth is 0 G and the available link bandwidth is 10 G".

The information maintained by the head node in a link state database is: "The maximum reserved bandwidth of the Link-10 is 10 G, the utilized link bandwidth is 0 G, and the available link bandwidth is 10 G".

Once the traffic runs on the te-path-3, for example, traffic of 1 G runs on the te-path-3, the network controller or the head node detects that the available link bandwidth of the Link-10 has changed. In this case, the network controller or the head node acquires a new available link bandwidth of 9 G, so the network controller or the head node can maintain the following information.

The information maintained by the network controller is: "The maximum reserved bandwidth of the Link-10 is 10 G, where the RLB @te-path-3 reserves 3 G, and 7 G remains as the allocated reserved bandwidth; and the utilized link bandwidth is 1 G and the available link bandwidth is 9 G".

The information maintained by the head node in a link state database is: "The maximum reserved bandwidth of the Link-10 is 10 G, the utilized link bandwidth is 1 G, and the available link bandwidth is 9 G".

Then, when another transmission channel (referred to as te-path-4) needs to be deployed within the network slice and the required bandwidth of the transmission channel (referred to as RLB @te-path-4) is 4 G, the network controller or the head node evaluates the physical links and determines the physical link for which the available link bandwidth is greater than or equal to the required bandwidth as the to-be-selected link, where, when evaluating the Link-10, the network controller or the head node determines that the available link bandwidth of the Link-10 (i.e. 9 G) is greater than the required bandwidth of the te-path-4 (i.e. 4 G). Therefore, the network controller or the head node determines that the Link-10 is the to-be-selected link, and then in conjunction with the requirements such as the link priority or the shortest path, determines that the Link-10 can be used as the path of the te-path-4, i.e. the network controller or the head node decides to allow the te-path-4 passing through the Link-10 (at which time no traffic is running on the te-path-4). Therefore, the network controller or the head node can maintain the following information.

The information maintained by the network controller is: "The maximum reserved bandwidth of the Link-10 is 10 G, where the RLB @te-path-3 reserves 3 G, the RLB @te-path-4 reserves 4 G, and 3 G remains as the allocated reserved bandwidth; and the utilized link bandwidth is 1 G and the available link bandwidth is 9 G".

The information maintained by the head node in a link state database is: "The maximum reserved bandwidth of the Link-10 is 10 G, the utilized link bandwidth is 1 G, and the available link bandwidth is 9 G".

Once the traffic runs on the te-path-4, for example, traffic of 1 G runs on the te-path-4, the network controller or the head node detects that the available link bandwidth of the Link-10 has changed. In this case, the network controller or the head node acquires a new available link bandwidth of 8 G, so the network controller or the head node can maintain the following information.

The information maintained by the network controller is: "The maximum reserved bandwidth of the Link-10 is 10 G, where the RLB @te-path-3 reserves 3 G, the RLB @te-path-4 reserves 4 G, and 3 G remains as the allocated reserved bandwidth; and the utilized link bandwidth is 2 G and the available link bandwidth is 8 G".

The information maintained by the head node in a link state database is: "The maximum reserved bandwidth of the Link-10 is 10 G, the utilized link bandwidth is 2 G, and the available link bandwidth is 8 G".

For the physical links within the network slice, the network controller or the head node maintains information similar to that described above, and determines, based on the information, whether a physical link can be included in one transmission channel, i.e. determines whether the available link bandwidth of the physical link is greater than or equal to the required bandwidth of the transmission channel. If the criterion is not satisfied, the transmission channel cannot pass through the physical link.

It is worth noting that, when the physical link is a bundled link, the network controller or the head node can also determine whether a transmission channel can pass through a bundled link according to the above criterion, i.e. determine whether the available link bandwidth of the bundled link is greater than or equal to the required bandwidth of the transmission channel. If the criterion is satisfied, the network controller or the head node may further decide whether to include in the transmission channel the bundled link itself or to include in the transmission channel one Layer 2 member link of the bundled link. For example, it is assumed that the available link bandwidth of the bundled link is 10 G, the bundled link includes two Layer 2 member links, and the available link bandwidth of each of the two layer 2 member links is 5 G, so if the required bandwidth of the transmission channel is 10 G, in this case, the bundled link itself needs to be included in this transmission channel, and load sharing for the traffic forwarded along this transmission channel is enabled in the bundled link; and if the required bandwidth of the transmission channel is 5 G, the network controller can select any one of the Layer 2 member links to be included in this transmission channel, and the traffic forwarded along this transmission channel is forwarded along the selected Layer 2 member link.

In an embodiment, after the path for the transmission channel is determined, the path determination method may further include, but is not limited to, the following step: a Quality of Service policy is configured for the path according to the network slice.

It is to be noted that, each node within the network can dynamically perceive which local links are added to a network slice and dynamically activate the configuration of the maximum reserved bandwidth corresponding to the network slice on these local links; or dynamically perceive which local links are no longer added to a network slice and dynamically deactivate the configuration of the maximum reserved bandwidth corresponding to the network slice on these local links.

When the configuration of the maximum reserved bandwidth corresponding to a network slice on a local link of the node is activated, this node can configure a Quality of Service policy (QoS policy) bound to the local link and corresponding to the network slice, thereby providing a bandwidth guarantee for the traffic of the network slice and not occupying bandwidth resources that do not belong to this network slice. It is to be noted that if this local link is added to multiple network slices at the same time, the node can configure multiple QoS policies bound to this local link, and these QoS policies are in one-to-one correspondence with the multiple network slices, i.e. configure one QoS policy per network slice.

It is to be noted that the QoS policy corresponding to a network slice for a physical link can include the maximum reserved bandwidth, traffic classes of service, queue scheduling policy, and drop policy configured on a physical link corresponding to the network slice. The queue scheduling policy may include Low Latency Queuing, Priority Queuing, Weighted Fair Queuing, etc., and the drop policy may include tail drop and random drop, etc.

It is to be noted that, there are various approaches to determine which network slice the forwarded packet in the physical link belongs to. For example, it is feasible to determine, according to the algorithm value corresponding to this forwarded packet and given in the local forwarding table entries, the network slice to which this forwarded packet belongs; or determine, according to the algorithm information explicitly carried in this forwarded packet, the network slice to which this forwarded packet belongs. After determining the network slice corresponding to the forwarded packet, the QoS policy related to the network slice can be configured for the network slice.

In an embodiment, after the path for the transmission channel is determined, the path determination method may further include, but is not limited to, the following step: a queue resource partition is performed on the path according to the network slice to obtain a resource sub-queue corresponding to the network slice.

It is to be noted that, to provide the bandwidth guarantee for the traffic of a specific network slice, it is feasible to partition the queue resources of the physical link according to the network slices to which the physical link is added, thereby allocating a dedicated resource sub-queue for each network slice. Therefore, the traffic of the network slice uses the resource sub-queue dedicated to this network slice, thereby avoiding irrelevant traffic from occupying the bandwidth resources of this network slice.

It is to be noted that, in an embodiment, the path determination method may include both of the above steps in which "a Quality of Service policy for the path is configured according to the network slice" and "a queue resource partition is performed on the path according to the network slice to obtain a resource sub-queue corresponding to the network slice". When the path determination method includes both of the above two steps, for the technical effects that the path determination method can achieve, the description of the above two steps can be referred to, which will not be repeated herein to avoid duplication of contents.

In an embodiment, after the path for the transmission channel is determined, the path determination method may further include, but is not limited to, the following step: a traffic shaper for the path is configured according to the network slice.

It is to be noted that the traffic shaper is used for restricting the transmission bandwidth of the path to not exceeding the maximum reserved bandwidth. To ensure that the traffic of the specific network slice does not occupy the bandwidth resources that do not belong to the network slice, the traffic shaper corresponding to the network slice can be maintained on the physical link, thereby limiting the traffic forwarding rate on the physical link, and making the traffic on the physical link not exceed the corresponding maximum reserved bandwidth.

Figure 5:
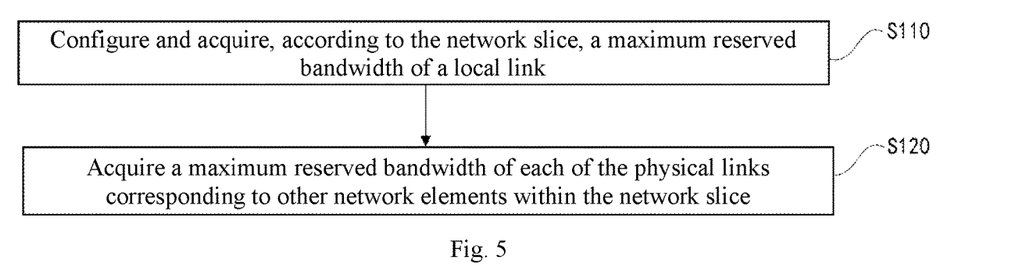
FIG. 5 is a detailed flowchart of acquiring a maximum reserved bandwidth in a path determination method provided by another embodiment of the present disclosure.

In an embodiment, in the case where the link bandwidth data includes a maximum reserved bandwidth, as shown in FIG. 5, the step S100 in which link bandwidth data of all physical links within a network slice are acquired may include, but is not limited to, the following steps.

At S110, a maximum reserved bandwidth of a local link is configured and acquired according to the network slice.

At S120, a maximum reserved bandwidth of each of the physical links corresponding to other network elements within the network slice is acquired.

It is to be noted that after the network slice is created, a maximum reserved bandwidth dedicated to the network slice can be configured for each of the physical links included within the network slice. Which physical link resources are included in the network slice is known only after a Flexible Algorithm Definition (FAD) corresponding to the network slice within the network has been advertised. When the contents of the FAD changes, the physical link(s) included within the network slice may also change. Therefore, each node within the network can dynamically perceive which local link(s) is/are added to a network slice and dynamically activate the configuration of the maximum reserved bandwidth corresponding to the network slice on these local links; or dynamically perceive which local link(s) is/are no longer added to a network slice and dynamically deactivate the configuration of the maximum reserved bandwidth corresponding to the network slice on these local links.

It is to be noted that for different physical links belonging to the same network slice, their maximum reserved bandwidths may be configured the same or different and may be appropriately decided according to the actual situations, which is not specifically limited in this embodiment.

It is to be noted that the maximum reserved bandwidths of the physical links corresponding to other network elements (such as nodes) within the network slice may be flooded by these nodes to other neighboring nodes. Therefore, the head node can acquire the maximum reserved bandwidths of the local links of these nodes, and in conjunction with the maximum reserved bandwidths configured by the head node for the local links of the head node, a link-state database maintained by the head node contains information of the maximum reserved bandwidths of all physical links within the whole network.

It is to be noted that if the local link is a bundled link, each respective Layer 2 member link of the bundled link has the configuration of a maximum reserved bandwidth corresponding to the respective Layer 2 member link. It is worth noting that one Layer 2 member link may belong to multiple network slices, so this Layer 2 member link has the configuration of multiple maximum reserved bandwidths, and these maximum reserved bandwidths are in a one-to-one correspondence with these network slices. In addition, the network slice to which the bundled link is added is a collection of network slices to which all Layer 2 member links of the bundled link are added, so the bundled link also has the configuration of a maximum reserved bandwidth corresponding to the bundled link itself, where the maximum reserved bandwidth of the bundled link for a network slice is the sum of the maximum reserved bandwidths of all Layer 2 member links belonging to this network slice in the bundled link.

Figure 6:
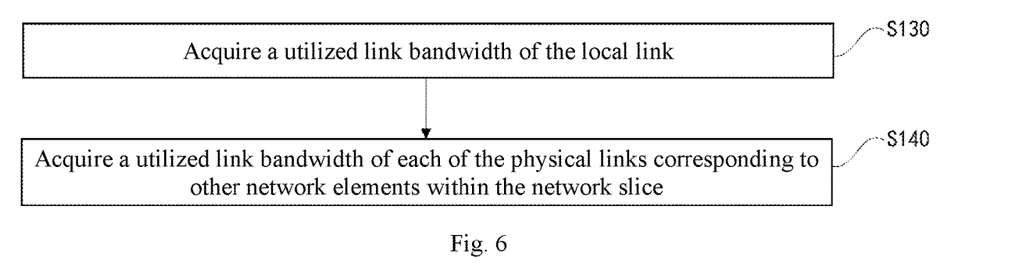
FIG. 6 is a detailed flowchart of acquiring a utilized link bandwidth in a path determination method provided by another embodiment of the present disclosure.

In an embodiment, in the case where the link bandwidth data further includes a utilized link bandwidth, as shown in FIG. 6, the step S100 in which link bandwidth data of all physical links within a network slice are acquired may further include, but is not limited to, the following steps.

At S130, a utilized link bandwidth of the local link is acquired.

At S140, a utilized link bandwidth of each of the physical links corresponding to other network elements within the network slice is acquired.

It is to be noted that each node within the network can count and measure traffic forwarded to each physical link and within a specific network slice, so as to obtain the utilized link bandwidth related to this network slice. The utilized link bandwidth may refer to an actual utilized bandwidth of the physical link exclusive to a network slice. The deployed traffic within the network slice is not always running at full capacity, or the maximum reserved bandwidth corresponding to this network slice is configured in the physical link but only a small amount of traffic is deployed within the network slice, so the utilized link bandwidth may not be able to reach the maximum reserved bandwidth. For example, it is assumed that one physical link having a physical bandwidth of 100 G is added to a first network slice and a second network slice, where the maximum reserved bandwidth corresponding to the first network slice configured in the physical link is 10 G and the maximum reserved bandwidth corresponding to the second network slice configured in the physical link is 20 G. However, the utilized link bandwidth corresponding to the first network slice actually measured in the physical link may be 1 G and the utilized link bandwidth corresponding to the second network slice actually measured in the physical link may be 2 G.

It is to be noted that the utilized link bandwidths of the physical links corresponding to other network elements (such as nodes) within the network slice may be flooded by these nodes to other neighboring nodes. Therefore, the head node can acquire the utilized link bandwidths of the local links of these nodes. In conjunction with the utilized link bandwidths, acquired by the head node, of the local links, the link-state database maintained by the head node contains information of the utilized link bandwidths of all physical links within the whole network.

It is to be noted that if the local link is a bundled link, each respective Layer 2 member link of the bundled link has a utilized link bandwidth corresponding to the respective Layer 2 member link. It is worth noting that one Layer 2 member link may belong to multiple network slices, so the Layer 2 member link may correspond to multiple utilized link bandwidths, and these utilized link bandwidths are in a one-to-one correspondence with these network slices. In addition, the network slice to which the bundled link is added is a collection of network slices to which all Layer 2 member links of the bundled link are added, so the bundled link also has a utilized link bandwidth corresponding to the bundled link itself, where the utilized link bandwidth of the bundled link for a network slice is the sum of the utilized link bandwidths of all Layer 2 member links belonging to this network slice in the bundled link.

Figure 7:
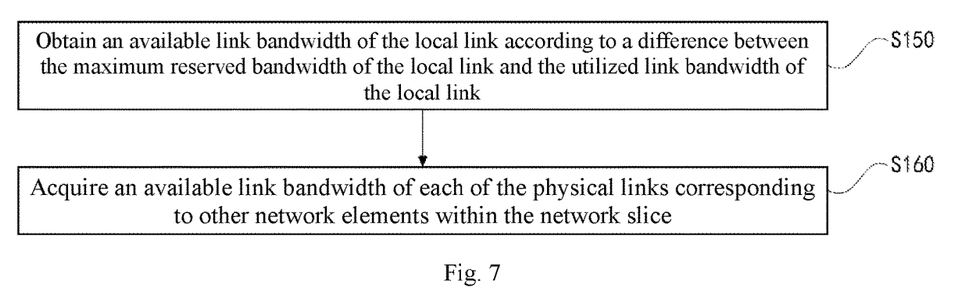
FIG. 7 is a detailed flowchart of acquiring an available link bandwidth in a path determination method provided by another embodiment of the present disclosure.

In an embodiment, in the case where the link bandwidth data further includes an available link bandwidth, as shown in FIG. 7, the step S100 in which link bandwidth data of all physical links within a network slice is acquired may further include, but is not limited to, the following steps.

At S150, an available link bandwidth of the local link is obtained according to a difference between the maximum reserved bandwidth of the local link and the utilized link bandwidth of the local link.

At S160, an available link bandwidth of each of the physical links corresponding to the other network elements within the network slice is acquired.

It is to be noted that since the available link bandwidth is the difference between the maximum reserved bandwidth and the utilized link bandwidth, the available link bandwidth of the local link of the head node can be obtained according to the difference between the maximum reserved bandwidth of the local link and the utilized link bandwidth of the local link. Available link bandwidths of the physical links corresponding to other network elements (such as nodes) within the network slice can be obtained by relevant information flooded by these nodes. Therefore, the head node can acquire the available link bandwidths of the local links of these nodes. Therefore, in conjunction with the available link bandwidths of the local links acquired by the head node, the link state database maintained by the head node contains information of the available link bandwidths of all physical links within the whole network.

It is to be noted that if the local link is a bundled link, each Layer 2 member link of the bundled link has an available link bandwidth corresponding to each Layer 2 member link itself. It is worth noting that one Layer 2 member link may belong to multiple network slices, so this Layer 2 member link may correspond to multiple available link bandwidths, and these available link bandwidths are in a one-to-one correspondence with these network slices. In addition, the network slice to which the bundled link is added is a collection of network slices to which all Layer 2 member links of the bundled link are added, so the bundled link also has an available link bandwidth corresponding to the bundled link itself, where the available link bandwidth of the bundled link for a network slice is the sum of the available link bandwidths of all Layer 2 member links belonging to this network slice in the bundled link.

Further, in an embodiment, the path determination method may also include, but is not limited to, the following steps: the maximum reserved bandwidth of the local link, the utilized link bandwidth of the local link and the available link bandwidth of the local link are externally advertised to enable the other network element within the network slice to save the maximum reserved bandwidth of the local link, the utilized link bandwidth of the local link, and the available link bandwidth of the local link.

It is to be noted that, after acquiring the maximum reserved bandwidth, the utilized link bandwidth and the available link bandwidth of the local link of the current node, the current node may advertise, to other neighboring nodes, the maximum reserved bandwidth, the utilized link bandwidth and the available link bandwidth of the local link (specifically, of which the maximum reserved bandwidth is activated) of the current node. In addition, if the current node receives the maximum reserved bandwidth, the utilized link bandwidth and the available link bandwidth from a neighboring node and corresponding to the local link of the neighboring node, the current node may first save such information and then continue to flood other neighboring nodes with such information. Therefore, the link state database maintained by each node within the network slice contains the maximum reserved bandwidths, the utilized link bandwidths and the available link bandwidths of all physical links within the network slice, thereby providing necessary relevant data for determining a path for a transmission channel from among all physical links to achieve the path selection based on the bandwidth resource reservation.

Taking the Intermediate System to Intermediate System (ISIS) protocol as an example, an embodiment in which the node advertises the maximum reserved bandwidth, the utilized link bandwidth, and the available link bandwidth separately within an IGP domain is described in detail below.

Figure 8:
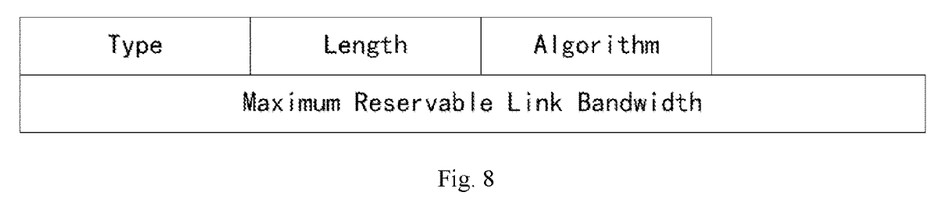
FIG. 8 is a schematic diagram of a field structure of a maximum reservable link bandwidth per algorithm sub-TLV provided by an embodiment of the present disclosure.

(1) Advertise the Maximum Reserved Bandwidth:

In an embodiment, the Maximum Reservable Link Bandwidth per Algorithm Sub-TLV can be added based on the standard RFC8570 to externally advertise the maximum reserved bandwidth. This newly added Sub-TLV may be included in the existing TLV-22, TLV-222, TLV-23, TLV-223, TLV-141 and TLV-25 of the ISIS protocol for advertisement. This newly added Sub-TLV advertises the maximum reserved bandwidth for a specific network slice between two directly connected ISIS neighbors, and the maximum reserved bandwidth is a unidirectional maximum reserved bandwidth from the node initiating the Link-State Advertisement (LSA) to its neighboring node. The structure of this newly added Sub-TLV is shown in FIG. 8. In FIG. 8, this newly added Sub-TLV includes the following field structure:

Type: 1 byte, indicating that this Sub-TLV is the Maximum Reservable Link Bandwidth per Algorithm Sub-TLV;

Length: 1 byte, indicating the length of this Sub-TLV excluding Type field and Length field;

Algorithm: 1 byte, indicating the corresponding algorithm type and for distinguishing the network slices, where a value range of 128 to 255 can be used in the FA mechanism to indicate that the value in Maximum Reservable Link Bandwidth field corresponds to a specific network slice;

Maximum Reservable Link Bandwidth: 4 bytes, indicating the maximum reserved bandwidth of the network slice corresponding to Algorithm field.

It is to be noted that, the maximum reserved bandwidth unrelated to the network slice can be classified as the corresponding maximum reserved bandwidth when the value of the Algorithm field is 0. Therefore, the maximum reserved bandwidth unrelated to the network slice may also be advertised by using this newly added Sub-TLV (where the Algorithm field needs to be set to 0), or be advertised by using a traditional known Sub-TLV (such as Maximum Reservable Link Bandwidth Sub-TLV defined by the standard RFC5305). It is worth noting that no matter which way is used to advertise, the advertised maximum reserved bandwidth unrelated to the network slice is the physical bandwidth of the physical link minus the sum of the maximum reserved bandwidths of all network slices on this physical link.

Figure 9:
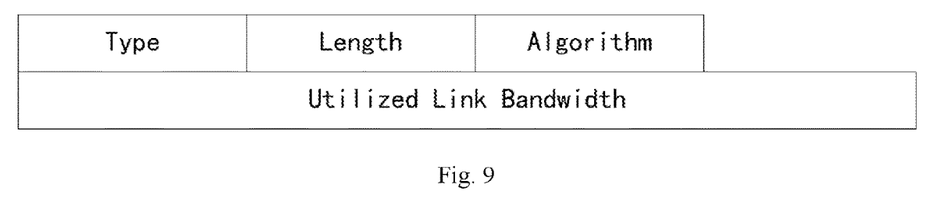
FIG. 9 is a schematic diagram of a field structure of a utilized link bandwidth per algorithm sub-TLV provided by an embodiment of the present disclosure.

(2) Advertise the Utilized Link Bandwidth:

In an embodiment, the Utilized Link Bandwidth per Algorithm Sub-TLV can be added based on the standard RFC8570 to externally advertise the utilized link bandwidth. This newly added Sub-TLV may be included in the existing TLV-22, TLV-222, TLV-23, TLV-223, TLV-141 and TLV-25 of the ISIS protocol for advertisement. This newly added Sub-TLV advertises the utilized link bandwidth for a specific network slice between two directly connected ISIS neighbors, and the utilized link bandwidth is a unidirectional utilized link bandwidth from the node initiating the link state advertisement to its neighboring node. The structure of this newly added Sub-TLV is shown in FIG. 9. In FIG. 9, this newly added Sub-TLV includes the following field structure:

Type: 1 byte, indicating that this Sub-TLV is the Utilized Link Bandwidth per Algorithm Sub-TLV;

Length: 1 byte, indicating the length of this Sub-TLV excluding Type field and Length field;

Algorithm: 1 byte, indicating the corresponding algorithm type and for distinguishing the network slices, where a value range of 128 to 255 can be used in the FA mechanism to indicate that the value in Utilized Link Bandwidth field corresponds to a specific network slice;

Utilized Link Bandwidth: 4 bytes, indicating the utilized link bandwidth of the network slice corresponding to Algorithm field.

It is to be noted that, the utilized link bandwidth unrelated to the network slice can be classified as the corresponding utilized link bandwidth when the value of the Algorithm field is 0. Therefore, the utilized link bandwidth unrelated to the network slice may also be advertised by using this newly added Sub-TLV (where the Algorithm field needs to be set to 0), or be advertised by using a traditional known Sub-TLV (such as Unidirectional Utilized Bandwidth Sub-TLV defined by the standard RFC8570).

Figure 10:
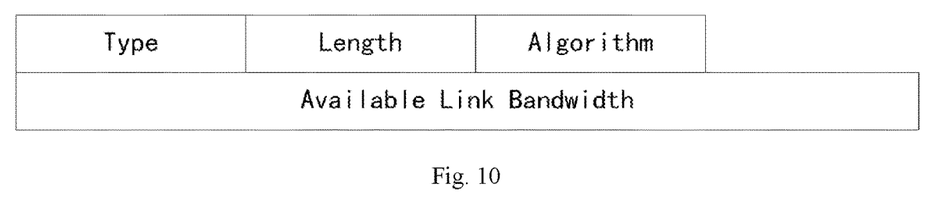
FIG. 10 is a schematic diagram of a field structure of an available link bandwidth per algorithm sub-TLV provided by an embodiment of the present disclosure.

(3) Advertise the Available Link Bandwidth:

In an embodiment, the Available Link Bandwidth per Algorithm Sub-TLV can be added based on the standard RFC8570 to externally advertise the available link bandwidth. This newly added Sub-TLV may be included in the existing TLV-22, TLV-222, TLV-23, TLV-223, TLV-141 and TLV-25 of the ISIS protocol for advertisement. This newly added Sub-TLV advertises the available link bandwidth for a specific network slice between two directly connected ISIS neighbors, and the available link bandwidth is a unidirectional available link bandwidth from the node initialing the link state advertisement to its neighboring node. The structure of this newly added Sub-TLV is shown in FIG. 10. In FIG. 10, this newly added Sub-TLV includes the following field structure:

Type: 1 byte, indicating that this Sub-TLV is Available Link Bandwidth per Algorithm Sub-TLV;

Length: 1 byte, indicating the length of this Sub-TLV excluding Type field and Length field;

Algorithm: 1 byte, indicating the corresponding algorithm type and for distinguishing the network slices, where a value range of 128 to 255 can be used in the FA mechanism to indicate that the value in Available Link Bandwidth field corresponds to a specific network slice;

Available Link Bandwidth: 4 bytes, indicating the available link bandwidth of the network slice corresponding to Algorithm field.

It is to be noted that the available link bandwidth unrelated to the network slice can be classified as the corresponding available link bandwidth when the value of the Algorithm field is 0. Therefore, the available link bandwidth unrelated to the network slice may also be advertised by using this newly added Sub-TLV (where the Algorithm field needs to be set to 0).

In addition, for the Open Shortest Path First (OSPF) protocol, such as OSPFv2 based on IPv4 network and OSPFv3 based on IPv6 network, it is also feasible to advertise, in a similar way to the ISIS protocol described above, by adding Sub-TLV and announcing this newly added Sub-TLV, the maximum reserved bandwidth, the utilized link bandwidth and the available link bandwidth for a specific network slice, which will not be repeated herein.

To illustrate the processing flow of the path determination method more clearly, examples are given below.

Example I

Figure 11:
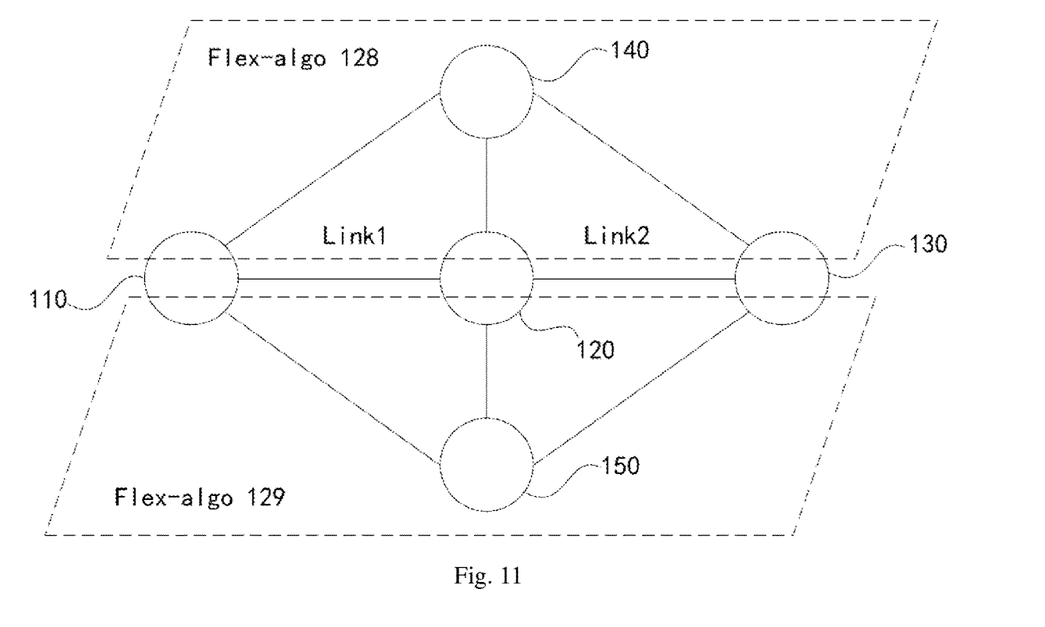
FIG. 11 is a schematic diagram of a network topology for performing a path determination method provided by an example of the present disclosure.

In the network topology shown in FIG. 11, two network slices are created, where the Algorithm value corresponding to the first network slice Flex-algo 128 is 128, and the Algorithm value corresponding to the second network slice Flex-algo 129 is 129. The first network slice Flex-algo 128 includes a first node 110, a second node 120, a third node 130, a fourth node 140 and bidirectional physical links connected between these nodes, and the second network slice Flex-algo 129 includes the first node 110, the second node 120, the third node 130, the fifth node 150 and bidirectional physical links connected between these nodes. The first network slice Flex-algo 128 and the second network slice Flex-algo 129 share a first physical link Link1 between the first node 110 and the second node 120 and a second physical link Link2 between the second node 120 and the third node 130.

The physical bandwidth of the first physical link Link1 is 100 G, the maximum reserved bandwidth allocated to the first network slice Flex-algo 128 is 10 G, and the maximum reserved bandwidth allocated to the second network slice Flex-algo 129 is 20 G. The physical bandwidth of the second physical link Link2 is 100 G, the maximum reserved bandwidth allocated to the first network slice Flex-algo 128 is 10 G, and the maximum reserved bandwidth allocated to the second network slice Flex-algo 129 is 20 G. The physical bandwidth of each of other physical links in the network topology is 1 G, and all physical bandwidths of these physical links are allocated to corresponding network slices. For example, the physical bandwidth of the physical link between the first node 110 and the fourth node 140 is 1 G, and 1 G bandwidth resources are all allocated to the first network slice Flex-algo 128, i.e. the maximum reserved bandwidth allocated by the physical link between the first node 110 and the fourth node 140 for the first network slice Flex-algo 128 is 1 G.

In this case, one transmission channel (referred to as te-path-SD-1) from the first node 110 to the third node 130 is created within the first network slice Flex-algo 128, and the required bandwidth of this transmission channel is 5 G. When the network controller is used for path calculation, the network controller first collects the link bandwidth data of all physical links in the network topology through the BGP-LS protocol, where the link bandwidth data includes the maximum reserved bandwidth (referred to as MRLB-A), the utilized link bandwidth (referred to as ULB-A) and the available link bandwidth (referred to as ALB-A) of each physical link. The network controller maintains the original static bandwidth reservation information shown in Table 1 below:

TABLE 1

| Original static bandwidth reservation information table | | | | |
|---|---|---|---|---|
| Physical link | Algorithm | Bandwidth resource | | |
| Link1 | Algorithm 0 | MRLB-A = 70 G | ULB-A = 0 G | ALB-A = 70 G |
|  | Algorithm 128 | MRLB-A = 10 G | ULB-A = 0 G | ALB-A = 10 G |
|  | Algorithm 129 | MRLB-A = 20 G | ULB-A = 0 G | ALB-A = 20 G |
| Link2 | Algorithm 0 | MRLB-A = 70 G | ULB-A = 0 G | ALB-A = 70 G |
|  | Algorithm 128 | MRLB-A = 10 G | ULB-A = 0 G | ALB-A = 10 G |
|  | Algorithm 129 | MRLB-A = 20 G | ULB-A = 0 G | ALB-A = 20 G |

The network controller calculates the path of the te-path-SD-1 according to constraint conditions of the first network slice Flex-algo 128 itself and additional bandwidth constraint conditions to obtain that the path of the te-path-SD-1 is <Link1, Link2>, i.e. the te-path-SD-1 needs to pass through the Link1 and the Link2. In this case, the network controller maintains the updated static bandwidth reservation information shown in Table 2 below:

TABLE 2

Updated static bandwidth reservation information table

| Physical link | Algorithm | Bandwidth resource | | |
|---|---|---|---|---|
| Link1 | Algorithm 0 | MRLB-A = 70 G | ULB-A = 0 G | ALB-A = 70 G |
| | Algorithm 128 | MRLB-A = 10 G (te-path-SD-1 reserves 5 G, and 5 G remains) | ULB-A = 0 G | ALB-A = 10 G |
| | Algorithm 129 | MRLB-A = 20 G | ULB-A = 0 G | ALB-A = 20 G |
| Link2 | Algorithm 0 | MRLB-A = 70 G | ULB-A = 0 G | ALB-A = 70 G |
| | Algorithm 128 | MRLB-A = 10 G (te-path-SD-1 reserves 5 G, and 5 G remains) | ULB-A = 0 G | ALB-A = 10 G |
| | Algorithm 129 | MRLB-A = 20 G | ULB-A = 0 G | ALB-A = 20 G |

When the created te-path-SD-1 begins to carry traffic, the network controller collects the updated ULB-A information and the updated ALB-A information of the corresponding physical link from the network. When the traffic runs on the te-path-SD-1 at full capacity, the ULB-A corresponding to the first network slice Flex-algo 128 in the Link1 and measured by the network controller is 5 G, and the ULB-A corresponding to the first network slice Flex-algo 128 in the Link2 and measured by the network controller is also 5 G, so it can be calculated that the ALB-A corresponding to the first network slice Flex-algo 128 in the Link1 is 5 G, and the ALB-A corresponding to the first network slice Flex-algo 128 in the Link2 is also 5 G. In this case, the network controller maintains the static bandwidth reservation information after the traffic runs as shown in Table 3 below:

TABLE 3

Static bandwidth reservation information table after traffic runs

| Physical link | Algorithm | Bandwidth resource | | |
|---|---|---|---|---|
| Link1 | Algorithm 0 | MRLB-A = 70 G | ULB-A = 0 G | ALB-A = 70 G |
| | Algorithm 128 | MRLB-A = 10 G (te-path-SD-1 reserves 5 G, and 5 G remains) | ULB-A = 5 G | ALB-A = 5 G |
| | Algorithm 129 | MRLB-A = 20 G | ULB-A = 0 G | ALB-A = 20 G |
| Link2 | Algorithm 0 | MRLB-A = 70 G | ULB-A = 0 G | ALB-A = 70 G |
| | Algorithm 128 | MRLB-A = 10 G (te-path-SD-1 reserves 5 G, and 5 G remains) | ULB-A = 5 G | ALB-A = 5 G |
| | Algorithm 129 | MRLB-A = 20 G | ULB-A = 0 G | ALB-A = 20 G |

In this case, another transmission channel (denoted as te-path-SD-2) from the first node 110 to the third node 130 is created in the first network slice Flex-algo 128, and the required bandwidth of this transmission channel is 6 G. When the network controller is used for path calculation, the network controller determines that the allocable reserved bandwidth and the available link bandwidth of the Link1 and the allocable reserved bandwidth and the available link bandwidth of the Link2 do not satisfy the required bandwidth of the te-path-SD-2, so the path calculation fails, i.e. the path of the te-path-SD-2 cannot pass through the Link1 and the Link2.

Example II

In the network topology shown in FIG. 11, two network slices are created, where the Algorithm value corresponding to the first network slice Flex-algo 128 is 128, and the Algorithm value corresponding to the second network slice Flex-algo 129 is 129. The first network slice Flex-algo 128 includes a first node 110, a second node 120, a third node 130, a fourth node 140 and bidirectional physical links connected between these nodes, and the second network slice Flex-algo 129 includes the first node 110, the second node 120, the third node 130, the fifth node 150 and bidirectional physical links connected between these nodes. The first network slice Flex-algo 128 and the second network slice Flex-algo 129 share a first physical link Link1 between the first node 110 and the second node 120 and a second physical link Link2 between the second node 120 and the third node 130.

The physical bandwidth of the first physical link Link1 is 100 G, the maximum reserved bandwidth allocated to the first network slice Flex-algo 128 is 10 G, and the maximum reserved bandwidth allocated to the second network slice Flex-algo 129 is 20 G. The physical bandwidth of the second physical link Link2 is 100 G, the maximum reserved bandwidth allocated to the first network slice Flex-algo 128 is 10 G, and the maximum reserved bandwidth allocated to the second network slice Flex-algo 129 is 20 G. The physical bandwidth of each of other physical links in the network topology is 1 G, and all physical bandwidths of these physical links are allocated to corresponding network slices. For example, the physical bandwidth of the physical link between the first node 110 and the fourth node 140 is 1 G, and 1 G bandwidth resources are all allocated to the first network slice Flex-algo 128, i.e. the maximum reserved bandwidth allocated by the physical link between the first node 110 and the fourth node 140 for the first network slice Flex-algo 128 is 1 G.

In this case, one transmission channel (referred to as te-path-SD-1) from the first node 110 to the third node 130 is created within the first network slice Flex-algo 128, and the required bandwidth of this transmission channel is 5 G. When the head node (i.e. the first node 110) is used for path calculation, the first node 110 first collects the link bandwidth data of all physical links in the IGP domain through the IGP protocols, where the link bandwidth data includes information such as the maximum reserved bandwidth (referred to as MRLB-A), the utilized link bandwidth (referred to as ULB-A) and the available link bandwidth (referred to as ALB-A) of each physical link. The link state database of the first node 110 stores the original link bandwidth information as shown in Table 4:

TABLE 4

Original link bandwidth information table

| Physical link | Algorithm | Bandwidth resource | | |
|---|---|---|---|---|
| Link1 | Algorithm 0 | MRLB-A = 70 G | ULB-A = 0 G | ALB-A = 70 G |
|  | Algorithm 128 | MRLB-A = 10 G | ULB-A = 0 G | ALB-A = 10 G |
|  | Algorithm 129 | MRLB-A = 20 G | ULB-A = 0 G | ALB-A = 20 G |
| Link2 | Algorithm 0 | MRLB-A = 70 G | ULB-A = 0 G | ALB-A = 70 G |
|  | Algorithm 128 | MRLB-A = 10 G | ULB-A = 0 G | ALB-A = 10 G |
|  | Algorithm 129 | MRLB-A = 20 G | ULB-A = 0 G | ALB-A = 20 G |

The first node 110 calculates the path of the te-path-SD-1 according to constraint conditions of the first network slice Flex-algo 128 itself and additional bandwidth constraint conditions. Since the ALB-A of the Link1 and the ALB-A of the Link2 are both greater than the required bandwidth of the te-path-SD-1, it can be obtained that the path of the te-path-SD-1 is <Link1, Link2>, i.e. the te-path-SD-1 needs to pass through the Link1 and the Link2.

When the created te-path-SD-1 begins to carry traffic, the ULB-A information and the ALB-A information of the Link1 and the ULB-A information and the ALB-A information of the Link2 are updated. When the traffic runs on the te-path-SD-1 at full capacity, the first node 110 can measure that the ULB-A corresponding to the first network slice Flex-algo 128 in the Link1 is 5 G, and the ULB-A corresponding to the first network slice Flex-algo 128 in the Link2 is also 5 G, so it can be calculated that the ALB-A corresponding to the first network slice Flex-algo 128 in the Link1 is 5 G, and the ALB-A corresponding to the first network slice Flex-algo 128 in the Link2 is also 5 G. In this case, the link state database of the first node 110 stores the link bandwidth information after the traffic runs as shown in Table 5:

TABLE 5

Link bandwidth information table after traffic runs

| Physical link | Algorithm | Bandwidth resource | | |
|---|---|---|---|---|
| Link1 | Algorithm 0 | MRLB-A = 70 G | ULB-A = 0 G | ALB-A = 70 G |
|  | Algorithm 128 | MRLB-A = 10 G | ULB-A = 5 G | ALB-A = 5 G |
|  | Algorithm 129 | MRLB-A = 20 G | ULB-A = 0 G | ALB-A = 20 G |
| Link2 | Algorithm 0 | MRLB-A = 70 G | ULB-A = 0 G | ALB-A = 70 G |
|  | Algorithm 128 | MRLB-A = 10 G | ULB-A = 5 G | ALB-A = 5 G |
|  | Algorithm 129 | MRLB-A = 20 G | ULB-A = 0 G | ALB-A = 20 G |

In this case, another transmission channel (referred to as te-path-SD-2) from the first node 110 to the third node 130 is created in the first network slice Flex-algo 128, and the required bandwidth of this transmission channel is 6 G. When the head node (i.e. the first node 110) is used for path calculation, the first node 110 determines that neither the available link bandwidth of the Link1 nor the available link bandwidth of the Link2 satisfies the required bandwidth of the te-path-SD-2, so the path calculation fails, i.e. the path of the te-path-SD-2 cannot pass through the Link1 and the Link2.

In addition, an embodiment of the present disclosure also provides a network element, including: a memory, a processor, and a computer program stored in the memory and executable by the processor.

The processor and the memory may be connected by a bus or by other means.

As a non-transitory computer-readable storage medium, the memory can be used to store a non-transitory software program and a non-transitory computer-executable program.

In addition, the memory may include a high-speed random access memory and a non-transitory memory, for example, at least one magnetic disk storage device, a flash memory device, or another non-transitory solid-state storage device. In some implementations, the memory may include memories remotely located with respect to the processor, and these remote memories may be connected to the processor via a network. Examples of the above-mentioned network include the Internet, an intranet, a local area network, a mobile communication network, and a combination thereof.

It is to be noted that the network element in this embodiment can be applied as the network controller or the first node 110 in the embodiment shown in FIG. 1, and the network element in this embodiment can form a part of the network topology in the embodiment shown in FIG. 1. These embodiments are of the same inventive concept, so these embodiments have the same implementation principle and technical effect, which will not be detailed here.

Non-transient software programs and instructions required to realize the path determination method in the above embodiments are stored in the memory, and when executed by the processor, cause the processor to perform the path determination method in any of the above embodiments, for example, execute the above-described method steps S100 to S300 in FIGS. 2, S310 to S330 in FIGS. 3, S340 to S350 in FIGS. 4, S110 to S120 in FIGS. 5, S130 to S140 in FIG. 6, or S150 to S160 in FIG. 7.

The embodiments of the network element described above are only for illustration. The units described as separate components may or may not be physically separated, that is, they may be located at one place or distributed to multiple network units. Some or all of the modules can be selected according to actual needs to achieve the purpose of this embodiment.

Furthermore, an embodiment of the present disclosure also provides a computer-readable storage medium storing computer-executable instructions which, when executed by a processor or controller, for example, by the processor in the above embodiment of the node, can cause the processor to perform the path determination method in any of the above embodiments, for example, to execute the above-described method steps S100 to S300 in FIGS. 2, S310 to S330 in FIGS. 3, S340 to S350 in FIGS. 4, S110 to S120 in FIGS. 5, S130 to S140 in FIG. 6, or S150 to S160 in FIG. 7.

An embodiment of the present disclosure includes: acquiring link bandwidth data of all physical links within a network slice, where the link bandwidth data corresponds to the network slice, and the network slice is created by an interior gateway protocol flex algorithm; acquiring a required bandwidth of a transmission channel within the network slice; and determining, according to the link bandwidth data and the required bandwidth, a path for the transmission channel from among all the physical links. According to the schemes provided by the embodiments of the present disclosure, according to the required bandwidth required by the transmission channel within the network slice, and the link bandwidth data of all the physical links within the network slice, the path satisfying the transmission channel is determined from among all the physical links. Since the path for the transmission channel is determined according to the link bandwidth data of the physical links and the required bandwidth required by the transmission channel, i.e. the path selection based on bandwidth resource reservation is achieved, paths can be arranged for service traffic within the entire network slice to avoid undesirable traffic congestions.

It can be understood by those having ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software can be distributed on computer-readable media, which can include computer-readable storage media (or non-transitory media) and communication media (or transitory media). As well known to those having ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those having ordinary skill in the art that communication media typically contain computer-readable instructions, data structures, program modules or other data in a modulated data signal such as a carrier wave or other transmission mechanism, and can include any information transmission media.

The above is a detailed description of some implementations of the present disclosure, but the present disclosure is not limited to the above-mentioned embodiments. Those having ordinary skill in the art can also make various equivalent modifications or replacements without departing from the scope of the present disclosure, and these equivalent modifications or replacements are all included in the scope defined by the appended claims of the present disclosure.

The invention claimed is:

1. A path determination method, which is applied to a network element, the method comprising:
   acquiring link bandwidth data of all physical links within a network slice, wherein the link bandwidth data corresponds to the network slice, and the network slice is created by an interior gateway protocol flex algorithm;
   acquiring a required bandwidth of a transmission channel within the network slice; and
   determining, according to the link bandwidth data and the required bandwidth, a path for the transmission channel from among all the physical links.

2. The method of claim 1, wherein the link bandwidth data comprises a maximum reserved bandwidth and an allocated reserved bandwidth, and determining, according to the link bandwidth data and the required bandwidth, a path for the transmission channel from among all the physical links comprises:
   obtaining an allocable reserved bandwidth according to a difference between the maximum reserved bandwidth and the allocated reserved bandwidth;
   determining, according to the allocable reserved bandwidth, to-be-selected links from among all the physical links, wherein the to-be-selected links are the physical links for which the allocable reserved bandwidth is greater than or equal to the required bandwidth; and
   determining the path for the transmission channel from among the to-be-selected links.

3. The method of claim 2, after determining the path for the transmission channel, the method further comprising:
   configuring a traffic shaper for the path according to the network slice, the traffic shaper being configured to restrict a transmission bandwidth of the path to not exceeding the maximum reserved bandwidth.

4. The method of claim 2, after determining the path for the transmission channel, the method further comprising:
   configuring a Quality of Service policy for the path according to the network slice; and
   performing, according to the network slice, a queue resource partition on the path to obtain a resource sub-queue corresponding to the network slice.

5. The method of claim 2, after determining the path for the transmission channel, the method further comprising:
   configuring a Quality of Service policy for the path according to the network slice; or
   performing, according to the network slice, a queue resource partition on the path to obtain a resource sub-queue corresponding to the network slice.

6. The method of claim 1, wherein the link bandwidth data comprises an available link bandwidth, and determining, according to the link bandwidth data and the required bandwidth, a path for the transmission channel from among all the physical links comprises:
   determining, according to the available link bandwidth, to-be-selected links from among all the physical links, wherein the to-be-selected links are the physical links for which the available link bandwidth is greater than or equal to the required bandwidth; and determining the path for the transmission channel from among the to-be-selected links.

7. The method of claim 6, after determining the path for the transmission channel, the method further comprising:
configuring a Quality of Service policy for the path according to the network slice; and
performing, according to the network slice, a queue resource partition on the path to obtain a resource sub-queue corresponding to the network slice.

8. The method of claim 6, after determining the path for the transmission channel, the method further comprising:
configuring a Quality of Service policy for the path according to the network slice; or
performing, according to the network slice, a queue resource partition on the path to obtain a resource sub-queue corresponding to the network slice.

9. The method of claim 1, after determining the path for the transmission channel, the method further comprising:
configuring a Quality of Service policy for the path according to the network slice; and
performing, according to the network slice, a queue resource partition on the path to obtain a resource sub-queue corresponding to the network slice.

10. The method of claim 1, wherein the link bandwidth data comprises a maximum reserved bandwidth, and acquiring link bandwidth data of all physical links within a network slice comprises:
configuring and acquiring, according to the network slice, a maximum reserved bandwidth of a local link; and
acquiring a maximum reserved bandwidth of each of the physical links corresponding to other network elements within the network slice.

11. The method of claim 10, wherein the link bandwidth data further comprises a utilized link bandwidth, and acquiring link bandwidth data of all physical links within a network slice further comprises:
acquiring a utilized link bandwidth of the local link; and
acquiring a utilized link bandwidth of each of the physical links corresponding to other network elements within the network slice.

12. The method of claim 11, wherein the link bandwidth data further comprises an available link bandwidth, and acquiring link bandwidth data of all physical links within a network slice further comprises:
obtaining an available link bandwidth of the local link according to a difference between the maximum reserved bandwidth of the local link and the utilized link bandwidth of the local link; and
acquiring an available link bandwidth of each of the physical links corresponding to other network elements within the network slice.

13. The method of claim 12, further comprising:
externally advertising the maximum reserved bandwidth of the local link, the utilized link bandwidth of the local link and the available link bandwidth of the local link, to enable the other network element within the network slice to save the maximum reserved bandwidth of the local link, the utilized link bandwidth of the local link, and the available link bandwidth of the local link.

14. A non-transitory computer-readable storage medium, storing computer-executable instructions configured to perform the path determination method of claim 1.

15. The method of claim 1, after determining the path for the transmission channel, the method further comprising:
configuring a Quality of Service policy for the path according to the network slice; or
performing, according to the network slice, a queue resource partition on the path to obtain a resource sub-queue corresponding to the network slice.

16. A network element, comprising:
a memory,
a processor, and
a computer program stored in the memory and executable by the processor,
wherein the computer program, when executed by the processor, causes the processor to perform a path determination method comprising:
acquiring link bandwidth data of all physical links within a network slice, wherein the link bandwidth data corresponds to the network slice, and the network slice is created by an interior gateway protocol flex algorithm;
acquiring a required bandwidth of a transmission channel within the network slice; and
determining, according to the link bandwidth data and the required bandwidth, a path for the transmission channel from among all the physical links.

* * * * *